March 3, 1970   R. H. SWAISGOOD   3,498,258
APPARATUS FOR TINNING THE ENDS OF INSULATED CONDUCTORS
Filed Oct. 18, 1967   7 Sheets-Sheet 1

INVENTOR.
RALPH H. SWAISGOOD
BY
Anderson, Spangler & Wymer

March 3, 1970  R. H. SWAISGOOD  3,498,258
APPARATUS FOR TINNING THE ENDS OF INSULATED CONDUCTORS
Filed Oct. 18, 1967  7 Sheets-Sheet 2

INVENTOR.
RALPH H. SWAISGOOD
BY
Anderson, Spangler & Wymore

March 3, 1970 R. H. SWAISGOOD 3,498,258
APPARATUS FOR TINNING THE ENDS OF INSULATED CONDUCTORS
Filed Oct. 18, 1967 7 Sheets-Sheet 3

INVENTOR.
RALPH H. SWAISGOOD
BY
Anderson, Spangler & Wymore

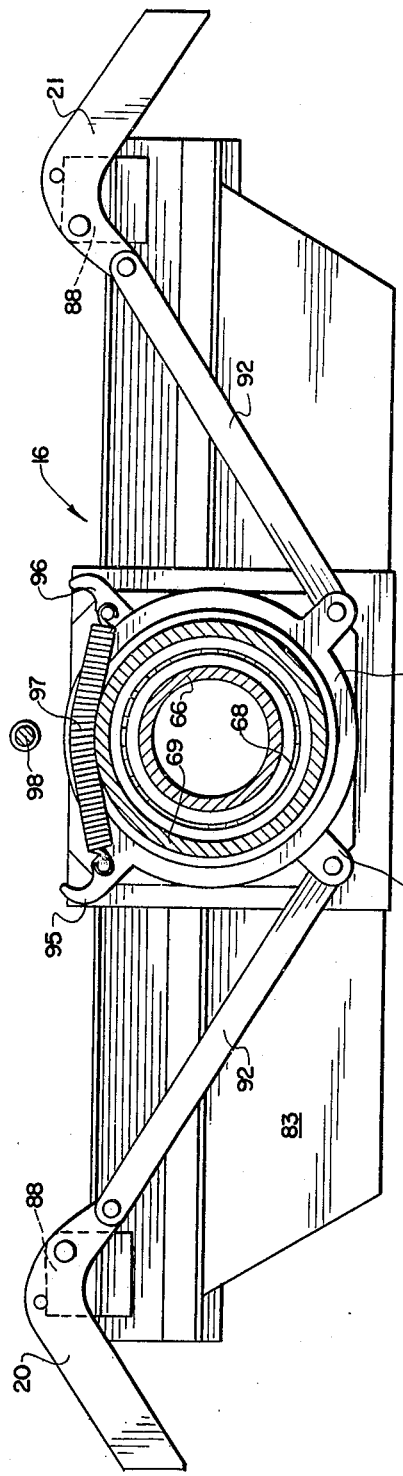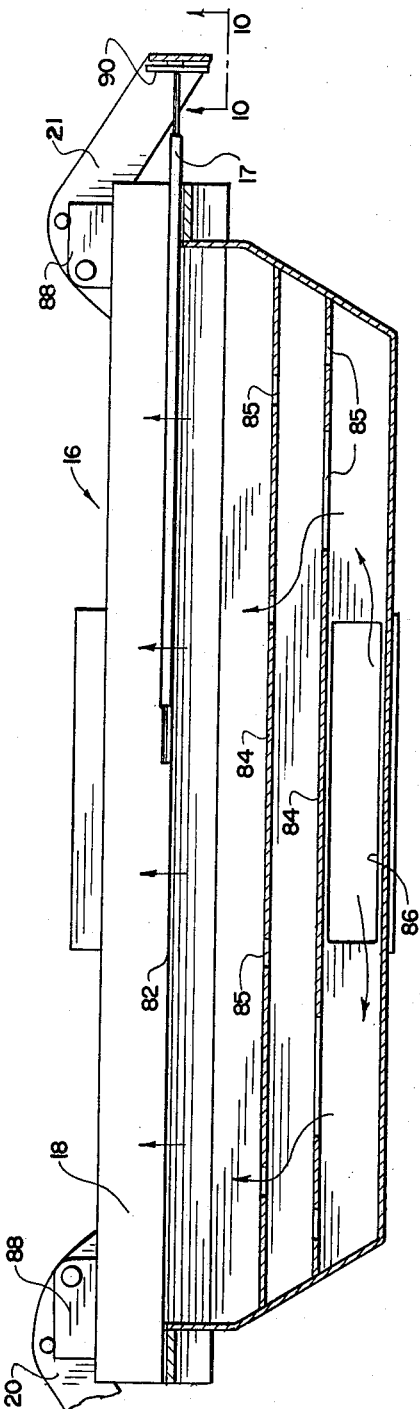

INVENTOR.
RALPH H. SWAISGOOD

| | SPIDER ROTATION | ARM ROTATION | AIR PRESSURE − | AIR PRESSURE + | EVENT |
|---|---|---|---|---|---|
| STA. 1 | 0° | 0° | X | | |
| STA. 2 | 30° | −40° | | X | |
| STA. 3 | 60° | −57° | X | | |
| STA. 4 | 90° | −90° | X | | |

INVENTOR.
RALPH H. SWAISGOOD
BY
Anderson, Spangler & Wymore

March 3, 1970   R. H. SWAISGOOD   3,498,258
APPARATUS FOR TINNING THE ENDS OF INSULATED CONDUCTORS
Filed Oct. 18, 1967   7 Sheets-Sheet 7
| | SPIDER ROTATION | ARM ROTATION | AIR PRESSURE − | AIR PRESSURE + | EVENT |
|---|---|---|---|---|---|
| STA. 5 | 120° | −130° | X | |  |
| STA. 6 | 150° | −45° | X | | 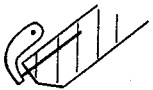 |
| STA. 7 | 180° | +40° | | X | 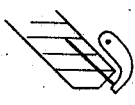 |
| STA. 8 | 210° | +60° | X | | 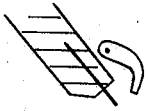 |
| STA. 9 | 240° | +130° | X | |  |
| STA. 10 | 270° | +90° | X | |  |
| STA. 11 | 300° | +50° | X | | 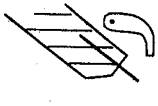 |
| STA. 12 | 330° | +50° | | X |  |
| STA. 13 | 345° TO 360° | 0° | X | | 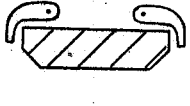 |
FIG. 15
INVENTOR.
RALPH H. SWAISGOOD
BY
Anderson, Spangler & Wymore United States Patent Office 3,498,258
Patented Mar. 3, 1970

3,498,258
APPARATUS FOR TINNING THE ENDS OF
INSULATED CONDUCTORS
Ralph H. Swaisgood, Fort Collins, Colo., assignor to
Storm Products Company, Los Angeles, Calif., a corporation of California
Filed Oct. 18, 1967, Ser. No. 676,202
Int. Cl. B05c 3/00, 11/00; C23c 13/08
U.S. Cl. 118—50                                    8 Claims

ABSTRACT OF THE DISCLOSURE

A fully automated machine which tins the ends of electrical wires or cylindrical shaped electronic components having been previously precut to length with the ends stripped of insulation. The machine includes a series of rotating working heads which pass the wire ends through flux and solder stations, whereby the heads employ alternately superatmospheric or positive and subatmospheric or negative air pressure to transport and hold the wires in place during the dipping and transportation cycle of movement.

With the current automation demands in the electronic industry, there has been a large need for precut lengths of electrical wire having their ends stripped and precoated or tinned with solder. The term "tinned" means that a thin coat of solder is applied to the surface of the wire by dipping it in a molten bath of solder. To pretin the end of a wire rather than supplying solder to the connection at the time the solder joint is made insures a better quality joint. In the case of stranded wire, the tinning operation not only applies solder to the outer periphery of the wire, but fills the voids between the strands.

The common method of tinning previously used has been to manually dip the wire ends in a solder pot. Since most wires require tinning both ends, the operator must turn the wire around and repeat the dipping operation on the other end. The length of time that ends of the wire are left in the molten solder depends on the solder temperature and the size of the wire. Approximately one second is required for copper wires .050 inch in diameter when the solder temperature is approximately 500° F. When the molten solder is wetted to the wire ends, it is imperative that a clean, oxide-free surface exist to insure a proper capillary action and a sound bond with the base metal. For this reason, the wire ends may be passed through a flux station prior to tinning. Molten solder baths have a tendency to form a layer of material called "dross" on the surface which, if allowed to contact the wire ends, will eventually contaminate the solder joint. A variety of methods can be used to remove dross on the surface of the solder such as the apparatus shown in my U.S. patent application Ser. No. 595,465.

The present invention replaces the hand method with a series of working heads which automatically dip each end of the wire within a fraction of the time involved in the hand operation. In some applications, the portion of the wire which is to be tinned must be kept within certain tolerances. With hand dipped wires, the percentage of rejects can be fairly high; whereas, with the present invention, all of the wires are dipped to exactly the same depth.

It is, therefore, the principal object of the present invention to provide a new and novel automated machine for tinning both ends of precut electrical wires with the insulation removed from the ends thereof.

Another object of the present invention is to provide an automated machine for tinning the ends of electrical wires or the wire ends of cylindrical shaped electronic components which employs the use of an air cushion to permit easy transport of the articles through the various stations of the operation.

An additional object of the invention is to provide an automated machine for tinning the ends of electrical wires which makes use of negative air pressure to hold the work product in place while it is being dipped.

Another object of the invention is to provide an automated machine for tinning the ends of cylindrical electrical components which machine inserts and removes the component into a solder bath along a path which is essentially parallel with the longitudinal axis of the component, which axial motion is conjoint with movement of the component to and away from the solder bath.

A further object of the invention is to provide an automated machine for tinning the ends of electrical conductors which synchronizes and indexes itself with the machine which supplies the precut and stripped wires regardless of the speed of said second machine.

Still another object of the invention is to provide an automated machine for tinning both ends of electrical conductors without regard to the length or diameter of said conductors.

Further objects and advantages of the invention will be in part apparent and in part pointed out specifically hereinafter in connection with the description of the drawings that follows and in which:

FIGURE 7 is a vertical section taken along line 7—7 of FIGURE 5 showing the arm assembly in the horizontal position;

FIGURE 8 is a vertical section taken along line 8—8 of FIGURE 5;

Figure 1:
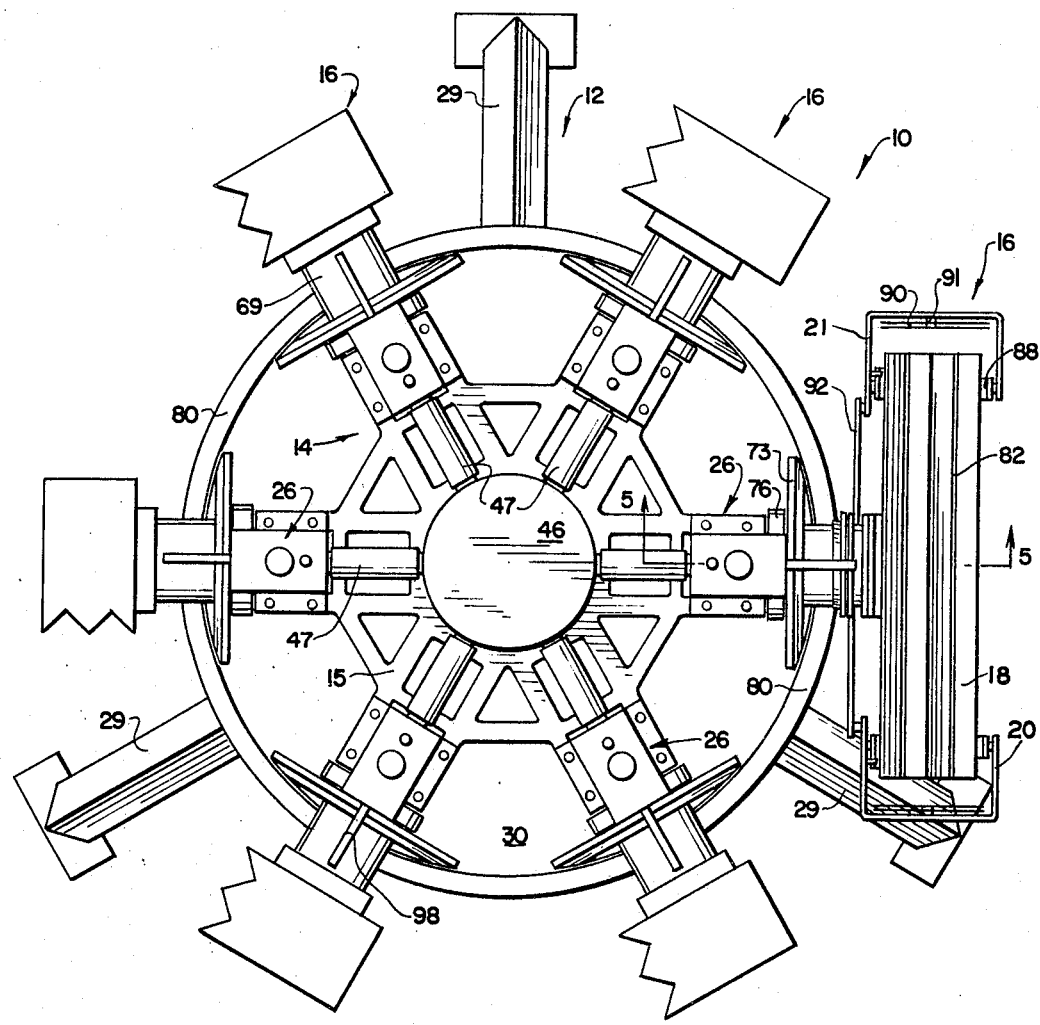
FIGURE 1 is a top plan view of the soldering machine, in which only one of the rotating heads is shown in detail, embodying my invention.
Figure 3:
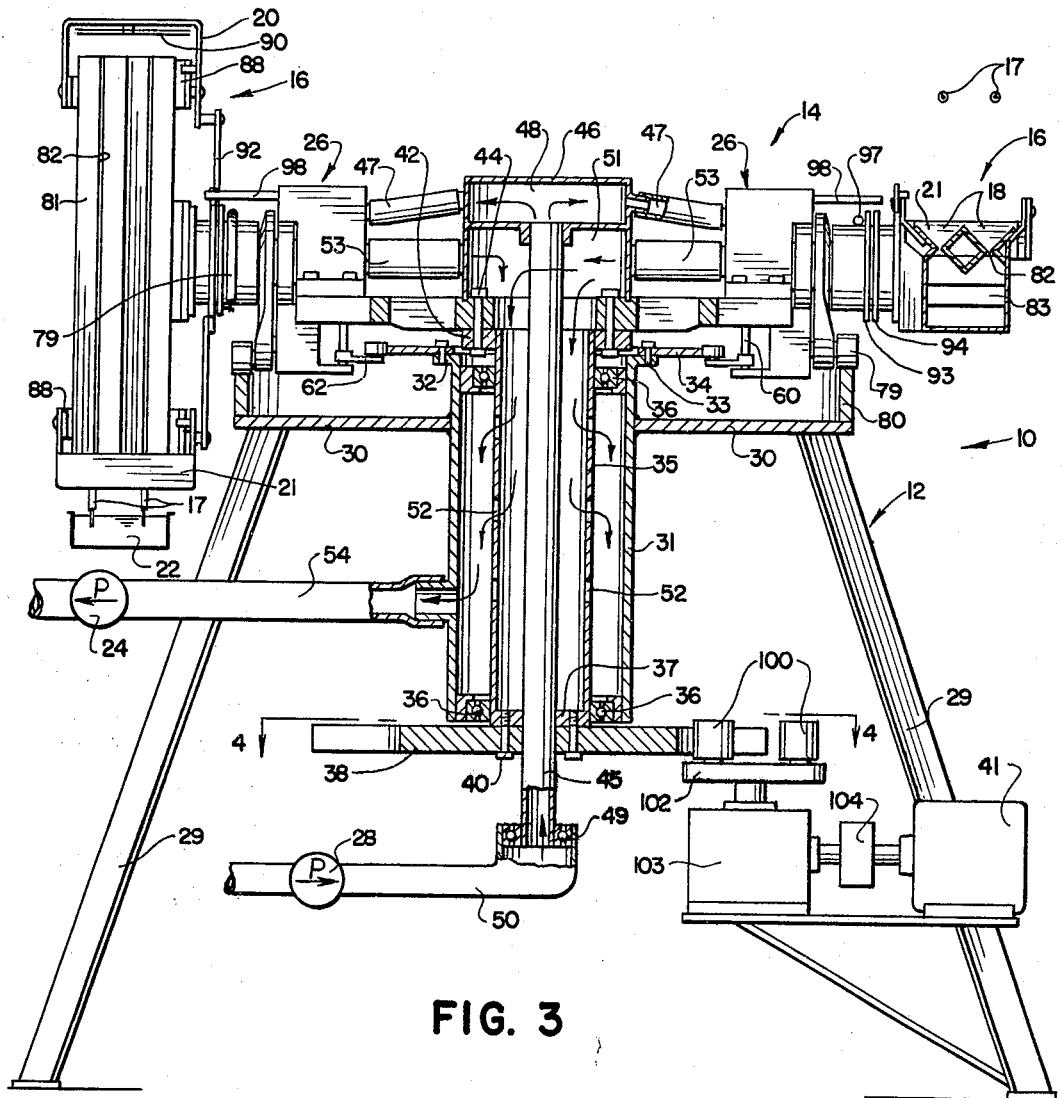
FIGURE 3 is a side elevational view of the machine with portions broken away to reveal the pneumatic flow path.

Referring now to the drawings for a detailed description of the invention and, more specifically, to FIGURES 1 and 3, it will be seen that the soldering machine has been designated in its entirety by reference numeral 10. The machine entails a stationary base frame 12 with a spider assembly 14 rotatably mounted in the center thereof. Angularly spaced on the outer extremities of the spider 14 are a series of six identical arm assemblies 16 as best seen in FIGURE 1. The arm assemblies 16 are rotatably journaled to the valve body 26 which will later be described in detail.

Briefly describing the operation of the machine 10, the spider assembly 14 is caused to rotate which, by reason of a series of circumferential cam surfaces, causes each of the arm assemblies 16 to rotate on its own axis and perform various functions as the spider assembly passes through a specific angular displacement.

The machine 10 is initially supplied with wires precut to length and having a length of the insulation stripped from each end. The wires can be hand fed or conveyor fed from an automatic cutting and stripping machine. There are currently many types of cutting and stripping machines in the trade which can be synchronized with the present machine in a manner as will later be described in connection with the electrical circuit.

In both FIGURES 1 and 3, a full line illustration of the arm assembly 16 is shown with the arm in the horizontal position. For purposes of illustration, the operating sequence of one arm assembly 16 will be described through a 360° rotation of the spider assembly 14, which is a complete cycle. At the beginning of the cycle of the spider, which will be referred to as 0° rotation, the arm assembly is horizontally positioned to receive two lengths of wire 17 as seen in FIGURE 3. The wires are dropped vertically to the receiving slots 18 in the arm 16 by hand or any type of automated dispensing machine. Condensers or other types of electrical components having a cylindrical body can also be processed in the present machine. Once the wires 17 are deposited in the slots 18, the arm is tilted to slidably position the wires against gate 20 for their first dipping, all of which will be further described in detail hereinafter. After being positioned, they are held in place in slot 18 by a vacuum while the gate 20 is removed and the free end of the wire 17 is dipped in a solder bath 22. While the arm assembly 16 is being rotated in a vertical plane, the entire spider assembly 14 is conjointly moved therewith horizontally about its own axis. Upon completion of the first dipping, the arm assembly 16 is rotated in a reverse direction causing the wires 17 to slide to the opposite end of the arm assembly 16 against a similar gate 21. The vacuum is again employed and the gate 21 is removed, preparing the opposite end of the wire 17 for dipping in the solder bath.

In FIGURE 3, the relative positions of a solder bath 22 and an arm assembly 16 are shown in a dipping position. After the second dipping, the arm 16 moves on to a discharge station, at which time the vacuum is released and the wires 17 are discharged into some form of bin or collection box. At this point, the spider assembly 14 has rotated through almost a complete 360 degrees. During the last 30 degrees rotation of the spider, the arm assembly is caused to rotate to its original horizontal position first mentioned above in preparation for a second cycle.

Figure 11:
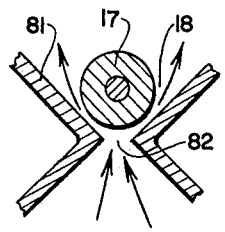
FIGURE 11 is an enlarged transverse section of the air slot having a work piece being supported by an air cushion therein.

All of the various operations briefly mentioned above which are preformed on the wires, such as gripping, moving and positioning, are performed with the assistance of a positive or negative air pressure. The negative air pressure or vacuum which is drawn across slots 18 is produced by a common pneumatic pump 24 symbolically illustrated in FIGURE 3. The vacuum supplied to the arm assembly 16 is controlled by a control valve 26, which will later be described in detail in the FIGURE 5 description. The positive air pressure supplied by pump 28 through the receiving slots 18 creates an air cushion under the wire 17 as illustrated in FIGURE 11. Whenever it is necessary to reposition or move the wire off the arm assembly 16, the air cushion allows the wire 17 to slide friction free along slot 18. Not only does the air cushion prevent the wires 17 from sticking in the slots but, by reason of the frictionless sliding, the timed interval necessary for transporting the wire is greatly decreased. This time interval is paramount to the operating speed of the machine which, in turn, effects the output or production.

Referring now to a more detailed description of the structure embodied in the present invention, the stationary base frame 12 includes three legs 29 which support a horizontal base plate 30, as best seen in FIGURE 3. The base plate 30 supports the entire rotating apparatus of the machine. Concentrically disposed in plate 30 is a cylindrical mounting tube 31 rigidly fastened thereto. The upper end of the tube 31 extends upward from plate 30 and terminates in a mounting flange 32. Mounted on the flange 32 by a series of bolts 33 is a horizontal cam plate 34 which operates the air control valve 26 further described in FIGURES 2 and 5. Located at each end of tube 31 is a pair of bearings 36 which rotatably supports the entire spider assembly 14.

In describing the spider assembly 14, we are including all of the structure which revolves about the vertical center axis of the machine as distinguishing from the stationary structure connected to the base frame 12. The spider assembly 14 includes a rotating sleeve 35 supported by bearings 36. The lower end of sleeve 35 carried a mounting plate 37 which, in turn, supports a star wheel type cam 38 through connecting bolts 40. The movement of the spider assembly is supplied through star wheel 38 and motor 41, further described in FIGURE 4. The upper end of sleeve 35 supports the spider 15 on a load carrying flange 42 through bolts 44. Attached to the spider 15 are a series of control valves 26 equally spaced at 60° intervals around the periphery thereof, as best seen in FIGURE 1.

Referring now particularly to the air flow paths, centrally disposed in sleeve 35 and passing through the center of star wheel 38 is a pipe 45 which supplies positive air pressure from pump 28 to the upper section 48 of plenum chamber 46. The air pressure is in turn supplied to the individual control valves 26 through conduit 47. Since pipe 45 rotates with the spider assembly 14, it is necessary to include an air-tight bearing 49 between the pipe and the stationary connecting passage 50. The vacuum or exhaust pump 24 draws the air through conduit 53 from each of the control valves 26 into the lower section 51 of plenum chamber 46. The air is then evacuated through the center of sleeve 35, openings 52 and out passage 54, as indicated by the arrows in FIGURE 3.

Figure 5:
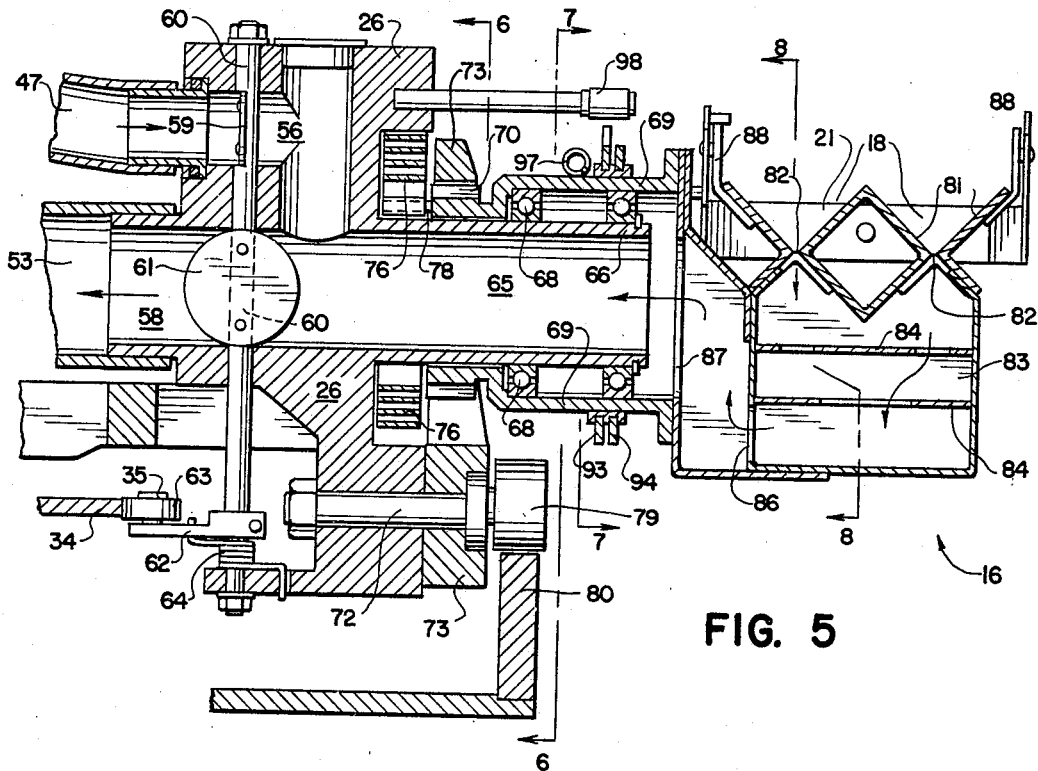
FIGURE 5 is a fragmentary vertical section taken along line 5—5 of FIGURE 1.

Referring now to FIGURE 5 which illustrates the control valve 26 and arm assembly 16 in detail, it can be seen that the positive and negative air pressure conduits 47 and 53 just mentioned above connect to passages 56 and 58, respectively, in the control valve 26. Running through passages 56 and 58 is a valve shaft 60 carrying butterfly valves 59 and 61. The butterfly valves are arranged 180° out of phase so that, when valve 59 is closed, valve 61 is open. Attached at the lower end of shaft 60 is a lever 62 with a pivotally journaled roller 63 acting as a cam follower to cam 34, shown in detail in FIGURE 2. Normally, butterfly valve 61 is spring biased in the open position, as seen in FIGURE 5, by spring 64. Passage 56 joins with passage 58 downstream from valve 59, whereby single passage 65 enters the arm assembly 16.

Figure 6:
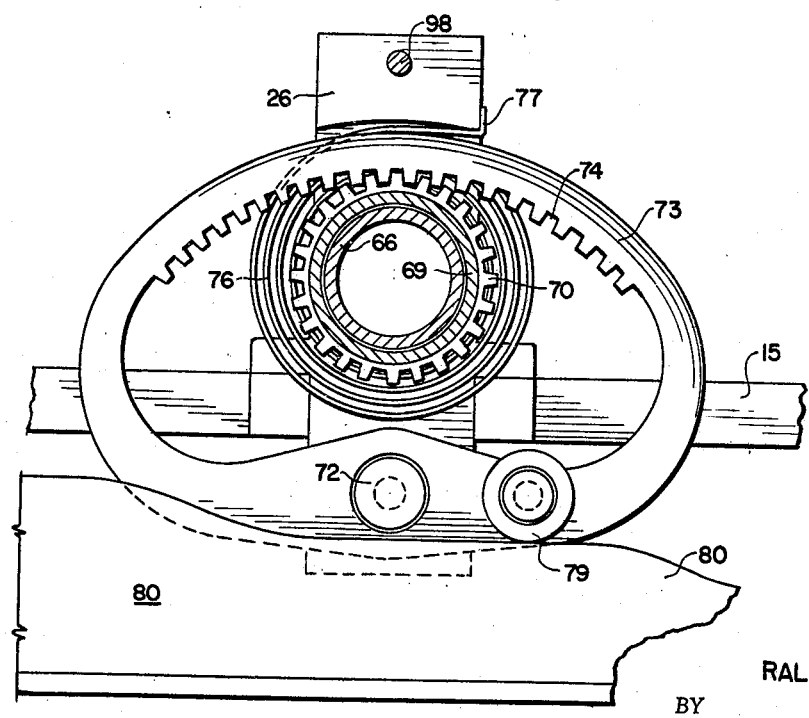
FIGURE 6 is a fragmentary section taken along line 6—6 of FIGURE 5.

Extending outwardly from control valve 26 is hollow bearing shaft 66 with passage 65 in the center thereof. Rotatably journaled to shaft 66 by bearings 68 is a hub 69 which supports the arm assembly. Integrally formed on the inner end of hub 69 is an arm support gear 70 as seen in FIGURES 5 and 6. Pivotally attached by pin 72 to the control valve 26 is segment gear 73 having teeth 74 which mesh with gear 70. The gear ratio between the two gears is 3.25:1, i.e. when the segment gear 73 rotates 10° about its pin 72, the arm support gear 70 rotates 32.5° about shaft 66. A coil spring 76, anchored at one end 77 to the control valve 26 and the other end to gear 70 by pin 78, is pretensioned to cause gear 70 to rotate in the clockwise direction as seen in FIGURE 6. The pretensioning also causes segment gear 73 to rotate in a clockwise direction, thereby maintaining roller 79 in contact with vertical cam 80. Since the arm assembly 16 is attached to the outer end of hub 69, the arm assembly 16 will rotate as the roller or cam follower rides up and down the cam surface 80.

The arm assembly 16 shown in section in FIGURE 5 includes a pair of receiving slots 18 having side walls 81 at right angles to each other terminating in a narrow slit 82. Disposed below the receiving slots 18 is an air chamber 83 having a series of baffles 84 dividing the chamber 83 into a series of compartments. The holes 85 in the baffles provide a means of diffusing the air flow out through the slits 82. Openings 86 and 87 in the side walls of chamber 83 connect passage 65 with the slits 82. Since the slits have a very small cross sectional area and the vacuum pump 24 has a substantial capacity, a sizable pressure drop is created across slits 82.

Figure 9:
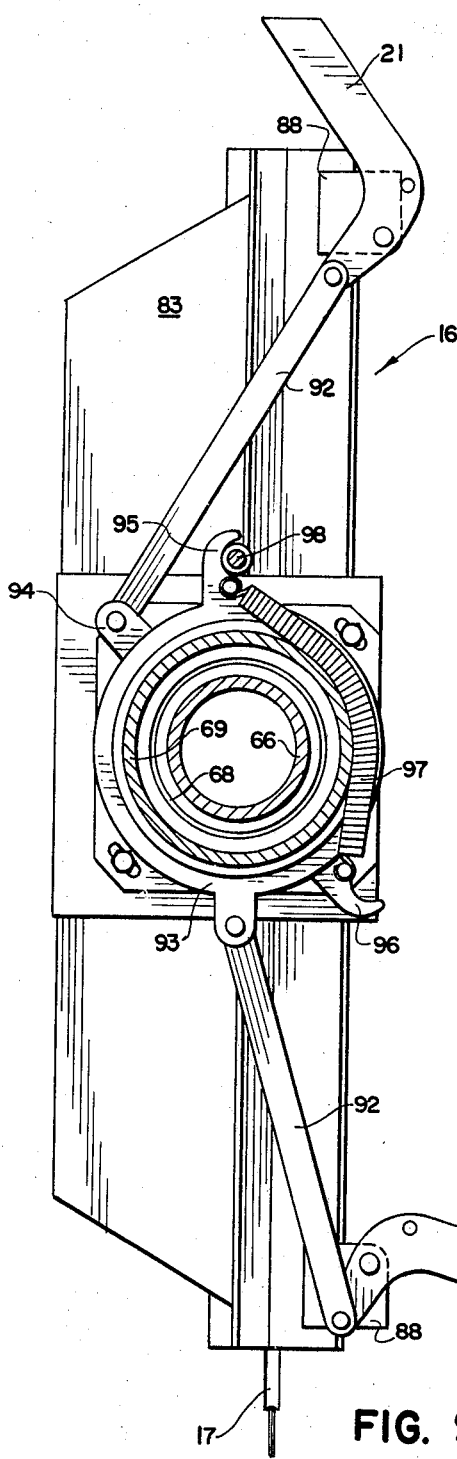
FIGURE 9 is a similar view of FIGURE 7 with the arm assembly in a vertical position.
Figure 10:
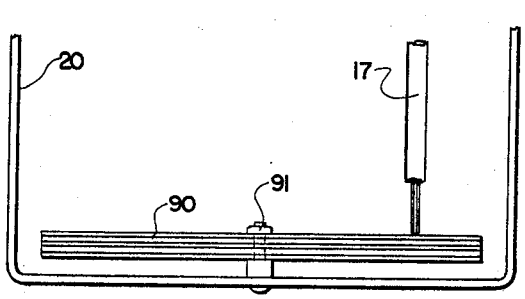
FIGURE 10 is a detailed fragmentary view taken along line 10—10 of FIGURE 8.

Pivotally attached to a bracket 88 at each end of the arm assembly is a gate 20 which obstructs the sliding movement of wires 17 as seen in FIGURE 8. Attached to the center portion of the gate 20 is a shock absorbing spring 90 which absorbs the impact of the wire end as it comes in contact with the gate. The spring 90 is mounted, as seen in FIGURE 10, with a bolt 91 through the center of the gate and spring, maintaining the spring 90 in spaced relation from the gate. The spring can be constructed of a variety of materials which have good shock absorbing qualities. The gates 20 are actuated by connecting links 92 pivotally connected to a pair of similar slip rings 93 and 94. The rings slide freely around the hub 69. Extending from each of the rings 93 and 94 are actuating hooks 95 and 96, respectively. The gates 20 are spring biased to the closed position by a tension spring 97 which attempts to move the hooks 95 and 96 together. To actuate one of the gates 20, it is necessary to rotate the arm assembly 16 through at least 45° of movement in either direction. For example, in FIGURE 7, rotation of the arm assembly in a clockwise direction brings actuating hook 95 into contact with the fixed rod 98 which extends from the control valve 26. Any further rotation will cause ring 93 to rotate relative to hub 69 and open the gate 20. In FIGURE 9, the arm assembly 16 is shown after 90° of rotation from the horizontal position with the gate 20 fully open.

Figure 4:
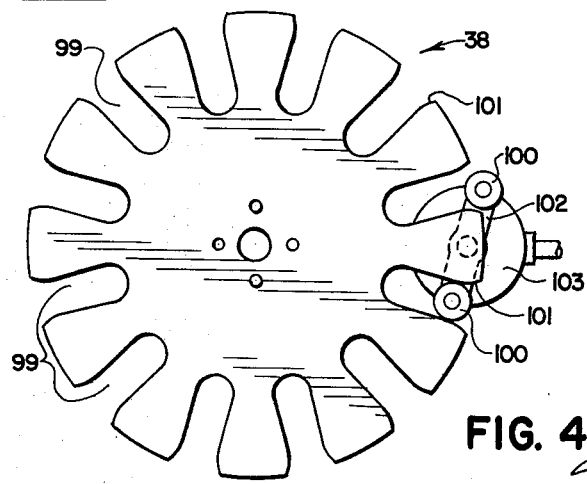
FIGURE 4 is a detached horizontal section of the star wheel taken along line 4—4 of FIGURE 3.

In FIGURE 4, the star wheel cam 38 is shown having twelve slots 99 equally spaced at 30° intervals therearound. The cam 38 is driven by a pair of rollers 100 carried on a drive arm 102 pivoting about its center. The outer edges 101 of the slots are rounded to provide a dwelling period. The power source 41 is an electric motor which drives a speed reducing gear box 103 through a magnetic type clutch 104. As the drive arm 102 is caused to rotate, the rollers 100 ride in and out of the slots 99 causing the star wheel 38 to intermittently rotate, stopping momentarily at twelve stations as it completes a 360° revolution. As the drive arm 102 reaches the position where one roller 100 is about to disengage from one slot 99 and the other roller is just entering the adjacent slot, the star wheel 38 is momentarily motionless. This period is called the "dwell" period. Since the star wheel 38 is attached to the spider assembly 14, the entire system moves with the same smooth intermittent motion through twelve stations.

Figure 2:
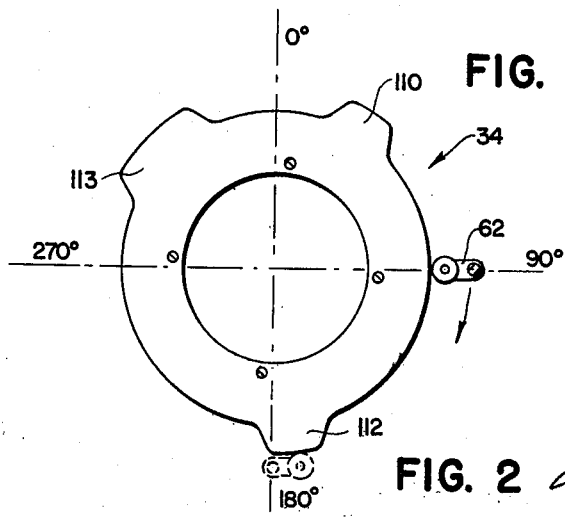
FIGURE 2 is a detached plan view of the horizontal cam plate and its respective follower.

The horizontal cam 34 is shown in detail in FIGURE 2. The cam operates the butterfly valves 61 and 59. When cam follower 62 is riding over one of three lobes, the negative pressure valve 61 is closed and the positive pressure valve 59 is open, thus providing an air cushion for any wires located in slots 18, as illustrated in FIGURE 11. When the cam follower 62 is between lobes, the valves are in the opposite position as just described, providing a suction across slots 18.

Figures 13, 14:
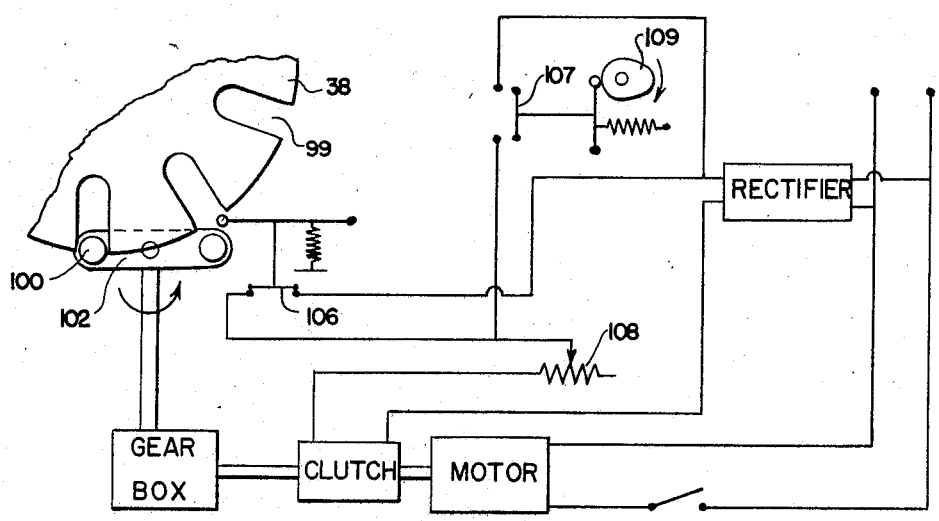
FIGURE 13 is a partly schematic circuit diagram of the electrical operating and sequencing circuit of the present invention.
FIGURE 14 is a table of stations 1 to 4 in the operating sequence of the arm assembly; and, FIGURE 15 is a similar table to FIGURE 14, describing stations 5 to 13 which completes a full cycle.

Referring now more particularly to the electrical circuit diagram of FIGURE 13, the machine 10 is intermittently rotated by the action of the rollers 100 riding into and out of the slots 99. When the machine is operating, the motor runs continuously. The clutch is of an electromagnetic type which engages when supplied with an ample source of D.C. current. The rheostat 108 adjusts the torque output of the clutch as to furnish torque adequate to run the machine 10, but the torque is limited to allow the clutch to slip in the event that the machine jams. The clutch is connected to a rectifier which supplies the D.C. current through switches 106 and 107. Normally, switch 106 is closed and switch 107 is open. In operation, as drive cam arm 102 approaches the dwell position, switch 106 is opened. This opens the circuit to the clutch and stops the rotation of arm 102. An instant later, switch 107 is closed momentarily by cam 109, thus reenergizing the circuit. Cam 109 rotates at the same speed as the automatic cutter stripper machine supplying the wire. As long as arm 102 rotates at a faster rate than cam 109, the arm will always be stopped by switch 106 in the dwell period to wait for the cutter stripper machine to catch up. In this manner, the two machines are always indexed and run in unison regardless of their different speeds as long as the tinning machine 10 is moving at a faster rate.

OPERATION OF THE TINNING MACHINE
THROUGH A COMPLETE CYCLE

To give an accurate explanation of the various operations performed by the machine 10, FIGURES 14 and 15 have been included to illustrate the various positions and functions performed by an arm assembly 16 and its related valves during each dwell period of the twelve angular stations.

At Station No. 1, the arm assembly 16 is dwelling in a horizontal position ready to receive the wires from an outside source. This being the starting point of the spider assembly's rotation, it is considered 0 degrees. Exhaust valve 61 being open as the wires fall into slots 18, they are firmly held in place by the air exhaust across slits 82.

At Station No. 2, the spider assembly 14 has moved through 30° and the arm assembly has rotated counter-clockwise 40°. Exhaust valve 61 has closed and positive air valve 59 has opened by reason of contact with lobe 110 (see FIGURE 2). With an air cushion beneath the wires 17, they quickly slide downward and come to rest positioned against the gate 20. As the spider begins to move toward Station No. 3, the positive air valve 59 closes and the exhaust valve 61 opens holding the wires in place. As the arm assembly rotates through —45°, the left hand gate begins to open.

At Station No. 3, at —57° rotation of the arm assembly, the gate is retracted with the end of the wire extending from the arm assembly ready for dipping in the solder bath.

Figure 12:
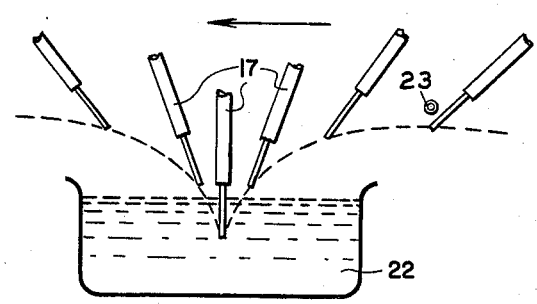
FIGURE 12 is an elevational view showing the various positions of a wire conductor during the dipping cycle.

As Station No. 4 is approached, and the arm assembly is rotated through 90°, the wire and arm assembly move in the direction of the arrow and follow the path illustrated in sequence in FIGURE 12. A jet of flux is applied to the wire by a nozzle 23. The wire is plunged into and withdrawn from the solder bath 22 along a path which is essentially parallel with the longitudinal axis of the wire. This minimizes the chances for solder barbs to form on the ends of the wires.

At Station No. 4, the wire reaches its maximum depth in the solder bath during the dwell period.

At Station No. 5, the arm assembly begins to rotate in the clockwise direction. As the arm assembly passes through Station No. 6, the left hand gate closes. The arm assembly continues to rotate passing through the horizontal.

At Station No. 7, the exhaust valve 61 is closed by lobe 112 and the air cushion quickly assists the wire in sliding to the opposite end of the arm into contact with the right gate. Approaching Station No. 8, vacuum valve 61 opens holding the wires in place. As the arm dips below 45°, the right hand gate begins to retract.

At Station No. 9, the arm reverses its direction as the wire remains positioned for dipping.

As Station No. 10 is approached, a jet of flux is impinged on the bare end of the wire from nozzle 21 and the extending wire and arm follow the same path shown in FIGURE 12.

At Station No. 11, the arm stops rotating at a 50° angle with the right gate remaining open.

At Station No. 12, when contact is made by actuator 62 with lobe 113, the valve 61 is closed and the vacuum is released with the wires being dropped into a collecting bin.

As Station No. 13 is approached, the air cushion stops and the vacuum valve is opened. At Station No. 13, the spider has moved through a full 360° and the cycle is ready to start again.

What is claimed is:

1. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; and, said air pressure means including a separate source of negative and positive air pressure ducted to said valve means, said valve means allowing either positive or negative air pressure to pass into the first duct causing a pressure drop across said opening in either valve position.

2. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surface whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressures ducted to said valve means, said valve means allowing either positive or negative air pressure to pass into the first duct causing a pressure drop across said opening in either valve position; a solder bath; and, gate means attached to each end of the rotatable arm for positioning the workpieces in said recesses immediately prior to dipping in the solder bath whereby a negative air pressure across said opening serves to hold a workpiece against movement and a positive air pressure thereacross serves to provide an air cushion to facilitate movement of a workpiece.

3. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressures ducted to said valve means, said valve means allowing either positive or negative air pressure to pass into the first duct causing a pressure drop across said opening in a selected valve position; a solder bath; and, gate means pivotally attached to each end of the rotatable arm movable from an open to a closed position where the gates are transversely positioned with respect to the longitudinal alignment of the work engaging recesses and spaced outwardly therefrom a distance permitting the end of a workpiece sliding in said recess to come into contact therewith whereby the end of the workpiece is positioned for dipping in said solder bath.

4. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressures ducted to said valve means, said valve means allowing either positive or negative air pressure to pass into the first duct causing a pressure drop across said opening in a selected valve position; gate means attached to each end of the rotatable arms for positioning the workpieces in said recesses; and, actuating means operatively connected to the gate means for moving the gate to the retracted position when the rotatable arm dips below a predetermined angular displacement.

5. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressures ducted to said valve means, said valve means allowing either positive or negative air pressure to pass into the first duct causing a pressure drop across said opening in a selected valve position; and gear means connecting the first cam follower to the rotatable arm whereby the angular displacement of the rotatable arm compared with the angular displacement of the cam follower is approximately 3.25 to 1.

6. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressure; a second duct connecting the negative air pressure to said valve means; a third duct connecting the positive air pressure to said valve means; and said valve means including two butterfly valves connected by a common shaft one being located in the second duct and the other in the third duct, said valves being positioned relative to each other whereby when one is opened the other is closed.

7. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; an arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of the spider wheel; a power transmission means connecting the power means to the spider wheel in the form of a star wheel having a series of radial slots equally spaced around the periphery thereof; a drive arm having a pair of rollers outwardly spaced thereon moving in a circular path, each roller alternately engaging said slots in driving relation whereby the star wheel rotates intermittently stopping momentarily as each roller engages in the slot; selectively engageable clutch means interconnecting said power transmission means and said power means; disengaging means operatively connected to said drive arm to disengage said clutch means at a predetermined position of the drive arm; and indexing means, whose movement is a function of the speed of operation of another machine, adapted to cause said clutch means to engage as a timed function of the other machine whereby the machines operate in predetermined timed relation.

8. A machine for automatically tinning the ends of precut and stripped electrical wires or cylindrical-shaped electronic components which comprises: a stationary base frame having a bearing mount mounted thereon; a horizontally disposed spider wheel rotatably journaled to the base frame through said bearing mount; at least one arm mount attached in radially extending and angularly spaced relation around the circumference of said wheel; at least one arm assembly attached to said arm mounts each including a valve means adapted to regulate air flow to and from the arm; and arm rotatably mounted on said arm mount having work engaging surfaces whereby said surfaces are adapted to hold and release a workpiece through the use of positive and negative air pressure; a source of air pressure connected to each arm assembly and regulated by each of said valve means; a first stationary cam means concentrically mounted on said base frame with respect to the axis of rotation of the spider wheel; a first cam follower operatively connected to each of said rotatable arms whereby as the spider wheel revolves each of said arms is caused to rotate about its respective axis; power means operatively connected to the spider wheel adapted to drive the wheel and arms respectively; a second stationary cam means concentrically mounted on said base frame; a second cam follower operatively connected to said valve whereby air pressure supplied to the working surface of the arm is regulated depending upon the angular displacement of th spider wheel; a power transmission means connecting the power source to the spider wheel whereby the power from a constant speed continuous motor is converted to an intermittent rotation; said work engaging surface defining at least one longitudinal recess for receiving a workpiece having a narrow opening at the bottom thereof; a first duct connecting said opening to said valve means; said air pressure means including a separate source of negative and positive air pressures ducted to said valve means, said valve means allowing either positive or negative air pressure to pass into the first duct causing a pressure drop across said opening in a selected valve position; a solder bath; gate means pivotally attached to each end of the rotatable arm movable from an open to a closed position where the gates are transversely positioned with respect to the longitudinal alignment of the work engaging recesses and spaced outwardly therefrom a distance permitting the end of a workpiece sliding in said recess to come into contact therewith whereby the end of the workpiece is positioned for dipping in said solder bath wherein the relative rotational positioning and speeds of the horizontally disposed spider wheel and the rotatably mounted arm are such that the insertion and withdrawal of the wire into and from the solder bath is essentially along the longitudinal axis of the wire to avoid the formation of solder barbs thereon.

References Cited

UNITED STATES PATENTS

| 2,426,391 | 8/1947 | Emerson | 118—301 X |
| 2,644,274 | 7/1953 | Bailey | 214—1 X |
| 2,776,640 | 1/1957 | Miklofsky et al. | 118—426 X |
| 2,821,158 | 1/1958 | Brown et al. | 214—1 X |
| 2,872,893 | 2/1959 | Kling | 118—426 X |

WALTER A. SCHEEL, Primary Examiner

J. P. McINTOSH, Assistant Examiner

U.S. Cl. X.R.

118—74, 426; 198—210; 214—1